US008196394B2

(12) United States Patent
Fujita et al.

(10) Patent No.: US 8,196,394 B2
(45) Date of Patent: Jun. 12, 2012

(54) EXHAUST PURIFICATION APPARATUS FOR ENGINE

(75) Inventors: Hiroaki Fujita, Kawasaki (JP); Satoshi Hiranuma, Kawasaki (JP); Minehiro Murata, Kawasaki (JP); Satoshi Yamazaki, Kawasaki (JP); Goro Iljima, Kawasaki (JP); Yoshinaka Takeda, Kawasaki (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 837 days.

(21) Appl. No.: 12/246,706

(22) Filed: Oct. 7, 2008

(65) Prior Publication Data
US 2009/0094964 A1 Apr. 16, 2009

(30) Foreign Application Priority Data

Oct. 9, 2007 (JP) ................................. 2007-263152
Oct. 17, 2007 (JP) ................................. 2007-270184
Oct. 17, 2007 (JP) ................................. 2007-270188

(51) Int. Cl.
*F01N 3/00* (2006.01)
*F01N 3/10* (2006.01)

(52) U.S. Cl. ................ 60/303; 60/286; 60/297; 60/295; 60/301

(58) Field of Classification Search .................... 60/286, 60/295, 297, 301, 303, 311; 422/168, 172
See application file for complete search history.

(56) References Cited

U.S. PATENT DOCUMENTS

| 5,628,186 | A | 5/1997 | Schmelz | |
|---|---|---|---|---|
| 2003/0110763 | A1* | 6/2003 | Pawson et al. | 60/286 |
| 2005/0069476 | A1* | 3/2005 | Blakeman et al. | 423/239.1 |
| 2005/0235632 | A1 | 10/2005 | Tarabulski et al. | |
| 2007/0101703 | A1* | 5/2007 | Kanaya et al. | 60/286 |

(Continued)

FOREIGN PATENT DOCUMENTS

DE 43 15 278 A1 11/1994

(Continued)

OTHER PUBLICATIONS

Fujita et al., English abstract of JP 2007-040224 A, Feb. 15, 2007.*

(Continued)

*Primary Examiner* — Thomas Denion
*Assistant Examiner* — Audrey K Bradley
(74) *Attorney, Agent, or Firm* — Rossi, Kimms & McDowell LLP (57) ABSTRACT

An exhaust purification apparatus for an engine comprises an upstream casing that has a cylindrical shape and accommodates a particulate filter; an exhaust gas outlet that is formed in a side wall of the upstream casing and discharges the exhaust gas that has passed through the particulate filter; a urea-water injector that is fixed to the upstream casing located in a position opposite to the exhaust gas outlet and injects urea-water toward the exhaust gas outlet; and a downstream casing that accommodates an ammonia selective reduction-type NOx catalyst into which the exhaust gas discharged from the exhaust gas outlet flows.

7 Claims, 7 Drawing Sheets

U.S. PATENT DOCUMENTS

| | | | |
|---|---|---|---|
| 2007/0137188 A1* | 6/2007 | Ohya et al. | 60/311 |
| 2008/0022658 A1 | 1/2008 | Viola et al. | |
| 2008/0127635 A1* | 6/2008 | Hirata et al. | 60/286 |
| 2008/0271440 A1 | 11/2008 | Xu et al. | |
| 2009/0084094 A1* | 4/2009 | Goss et al. | 60/301 |
| 2009/0094964 A1* | 4/2009 | Fujita et al. | 60/297 |
| 2009/0100827 A1* | 4/2009 | Suzuki et al. | 60/295 |

FOREIGN PATENT DOCUMENTS

| | | | |
|---|---|---|---|
| DE | 10 2005 041 660 A1 | | 3/2007 |
| DE | 10 2008 018 063 A1 | | 11/2008 |
| GB | 2381218 A | * | 4/2003 |
| JP | 62-138810 U | | 9/1987 |
| JP | 10-511038 A | | 10/1998 |
| JP | 2003-222019 A | | 8/2003 |
| JP | 2005-273503 A | | 10/2005 |
| JP | 2006-057575 A | | 3/2006 |
| JP | 2007040224 A | * | 2/2007 |
| JP | 2007-162487 A | | 6/2007 |
| JP | 2007-162488 A | | 6/2007 |
| JP | 2007-222819 A | | 9/2007 |
| JP | 2008-163856 A | | 7/2008 |

OTHER PUBLICATIONS

Nishiyama, Machine Translation of JP 2007-222819 A, Sep. 6, 2007.*

First Office Action issued in corresponding German Patent Application No. 10 2008 050 356.8 dated Jun. 1, 2010, which corresponds to related co-pending U.S. Appl. No. 12/251,135.

Office Action issued in corresponding Chinese Patent Application No. 200810171511.4 dated Jul. 5, 2010, which corresponds to related co-pending U.S. Appl. No. 12/251,135.

Related co-pending U.S. Appl. No. 12/251,135, filed Oct. 14, 2008; specification, claims and abstract, pp. 1-35; drawings, FIGS 1-4.

Japanese Office Action in corresponding JP 2007-263152, dated Aug. 17, 2011.

* cited by examiner

EXHAUST PURIFICATION APPARATUS FOR ENGINE

BACKGROUND OF THE INVENTION

1. Field of the Invention

The present invention relates to an exhaust purification apparatus for purifying engine exhaust gas, and more particularly, to an exhaust purification apparatus having a particulate filter that traps particulates contained in exhaust gas and an ammonia selective reduction-type NOx catalyst that selectively reduces NOx contained in exhaust gas by using ammonia as a reducing agent.

2. Description of the Related Art

Exhaust gas that is emitted from an engine such as a diesel engine contains particulates, NOx (nitrogen oxide) and the like, which are air pollutants. In order to prevent the particulate emission into the atmosphere, a conventional exhaust purification apparatus traps the particulates contained in exhaust gas by using a particulate filter that is set in an exhaust path of an engine.

Also in order to deal with NOx, another conventional exhaust purification apparatus has an ammonia selective reduction-type NOx catalyst that is interposed in an exhaust path of an engine and purifies exhaust gas by selectively reducing NOx with ammonia as a reducing agent. This apparatus supplies urea-water into the exhaust gas existing in the upstream of the ammonia selective reduction-type NOx catalyst. The urea-water is hydrolyzed by exhaust gas heat to produce ammonia, and this ammonia is supplied to the ammonia selective reduction-type NOx catalyst. Some of the ammonia supplied to the ammonia selective reduction-type NOx catalyst is once adsorbed to the ammonia selective reduction-type NOx catalyst. The ammonia selective reduction-type NOx catalyst promotes denitrifying reaction between the ammonia and the NOx contained in the exhaust gas. In this manner, NOx reduction is carried out.

For example, Unexamined Japanese Patent Publication No. 2007-162487 (hereinafter, referred to as Document 1) proposes an exhaust purification apparatus that is constructed by combining a particulate filter and an ammonia selective reduction-type NOx catalyst for the purpose of efficient particulate trapping and NOx reduction. The exhaust purification apparatus described in Document 1 is formed of an upstream casing and a downstream casing that is disposed in the downstream of the upstream casing and communicates with the upstream casing through a communication path. A pre-stage oxidizing catalyst is placed in the upstream casing, and the particulate filter is set in the downstream of the pre-stage oxidizing catalyst. One of the functions of the pre-stage oxidizing catalyst is to produce $NO_2$ by oxidizing NO contained in exhaust gas. The $NO_2$ is used for the continuous regeneration of the particulate filter.

An ammonia selective reduction-type NOx catalyst is placed in the downstream casing, and a post-stage oxidizing catalyst is set in the downstream of the ammonia selective reduction-type NOx catalyst. One of the functions of the post-stage oxidizing catalyst is to remove from exhaust gas the ammonia that has flowed out of the ammonia selective reduction-type NOx catalyst.

Interposed in the communication path connecting the upstream and downstream casings is a urea-water injector that injects and supplies urea-water into exhaust gas existing in the communication path. The urea-water injected from the urea-water injector is hydrolyzed by exhaust gas heat, and ammonia is produced. This ammonia is supplied to the ammonia selective reduction-type NOx catalyst as a reducing agent.

When the exhaust purification apparatus is thus constructed, an injecting direction of the urea-water that is injected from the urea-water injector interposed in the communication path is virtually orthogonal to a flowing direction of the exhaust gas within the communication path where the urea-water injector is interposed. Amount of the exhaust gas flowing through the communication path fluctuates according to the driving condition of the engine. When the exhaust gas flow rate is relatively low, the urea-water reaches a point that is relatively far from the urea-water injector as viewed in an injecting direction of the urea-water. In contrast, when the exhaust gas flow rate is relatively high, once the urea-water reaches a point that is relatively close to the urea-water injector as viewed in the injecting direction of the urea-water, the exhaust gas causes the urea-water to flow downstream. In other words, a zone containing a rich urea-water spray moves depending upon an exhaust flow rate. It is then difficult to spray the urea-water so that a certain distribution of the urea-water spray is obtained in the exhaust gas all the time.

One idea for injecting the urea-water along an exhaust gas flow as well as possible is, for example, to fix the urea-water injector to the communication path in an inclined position with respect to an axis of the communication path. Nevertheless, the urea-water injector still has to be fixed onto the circumferential wall of the communication path in a position directed from the outside and the inside of the communication path. For this reason, the urea-water injecting direction from the urea-water injector still does not coincide with the exhaust-gas flowing direction within the communication path. Consequently, as with the exhaust purification apparatus of Document 1, when the amount of the exhaust gas flowing through the communication path fluctuates, the zone containing the rich urea-water spray moves depending upon the exhaust flow rate. It is therefore difficult to spray the urea-water so that a certain distribution of the urea-water spray is obtained in the exhaust gas all the time.

If the distribution of the urea-water spray is changed according to the fluctuation of the exhaust flow rate, the distribution of the ammonia produced from the urea-water is also changed according to the fluctuation of the exhaust flow rate. The fluctuation of the exhaust flow rate makes uneven the distribution of the ammonia in the ammonia selective reduction-type NOx catalyst. This eventually causes the problem that the ammonia selective reduction-type NOx catalyst is deteriorated in purification efficiency.

SUMMARY OF THE INVENTION

An aspect of the present invention is directed to an exhaust purification apparatus for an engine, having a particulate filter that traps particulates contained in engine exhaust gas and an ammonia selective reduction-type NOx catalyst that selectively reduces NOx contained in the exhaust gas by using ammonia as a reducing agent, the apparatus comprising an upstream casing that has a cylindrical shape and accommodates the particulate filter; an exhaust gas outlet that is formed in a side wall of the upstream casing so as to be located downstream from the particulate filter, and discharges the exhaust gas that has passed through the particulate filter; a urea-water injector that is fixed to the upstream casing to be located in a position opposed to the exhaust gas outlet, and injects urea-water toward the exhaust gas outlet; and a downstream casing that accommodates the ammonia selective reduction-type NOx catalyst into which the exhaust gas discharged from the exhaust gas outlet flows.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

One embodiment of the present invention will be described below with reference to the attached drawings.

Figure 1:
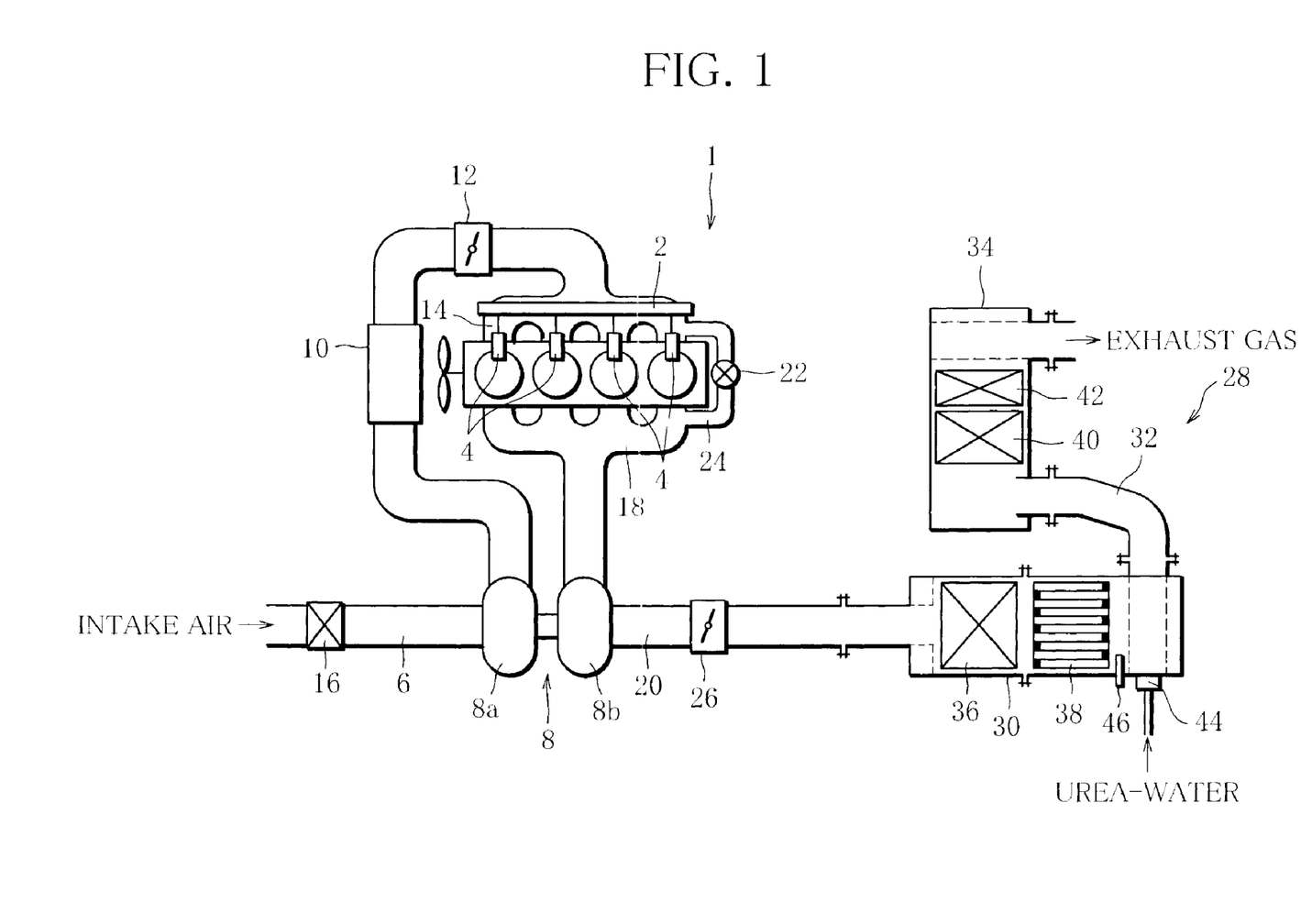
FIG. 1 is a view showing an entire configuration of an engine apparatus to which an exhaust purification apparatus according to one embodiment of the invention is applied.

FIG. 1 is a view showing an entire constitution of an engine apparatus having a four-cylinder diesel engine (hereinafter, referred to as engine) 1, to which an exhaust purification apparatus according to one embodiment of the present invention is applied. Referring to FIG. 1, details of the constitution of the engine apparatus will be explained.

The engine 1 includes a high-pressure accumulation chamber (hereinafter, referred to as common rail) 2 that is provided commonly to cylinders. High-pressure fuel that is supplied from a fuel injection pump, not shown, and stored in the common rail 2 is supplied to injectors 4 of the cylinders and is then injected from the injectors 4 into the cylinders.

A turbocharger 8 is interposed in an intake path 6. Intake air that has been sucked from an air cleaner, not shown, flows through the intake path 6 to a compressor 8a of the turbocharger 8. The intake air that has been turbocharged by the compressor 8a is introduced through an intercooler 10 and an intake control valve 12 to an intake manifold 14. An intake air flow rate sensor 16 for detecting a flow rate of an intake-air that is supplied to the engine 1 is set in the intake path 6 to be located upstream from the compressor 8a.

An exhaust port, not shown, through which exhaust gas is discharged from the cylinders of the engine 1, is connected to an exhaust manifold 18 through an exhaust pipe 20. Interposed between the exhaust manifold 18 and the intake manifold 14 is an EGR path 24 connecting the exhaust and intake manifolds 14 is an EGR path 34 connecting the exhaust and intake manifolds 18 and 14 via an EGR valve 22.

The exhaust pipe 20 is interposed with a turbine 8b of the turbocharger 8, and is connected to an exhaust after-treatment device 28 via an exhaust throttle valve 26 that is set downstream of the turbine 8b. A rotary shaft of the turbine 8b is mechanically coupled to a rotary shaft of the compressor 8a. The compressor 8a is driven by the turbine 8b that has received the exhaust gas flowing through the exhaust pipe 20.

The exhaust after-treatment device 28 has an upstream casing 30 and a downstream casing 34 connected to a downstream side of the upstream casing 30 through a communication path 32. A pre-stage oxidizing catalyst 36 is placed in the upstream casing 30, and a particulate filter (hereinafter, referred to as filter) 38 is set in the downstream of the pre-stage oxidizing catalyst 36.

The filter 38 is provided for the purpose of trapping particulates contained in exhaust gas to purify the exhaust gas of the engine 1. The filter 38 is formed of a honeycomb-type ceramic body, in which a large number of paths connecting the upstream side and the downstream side are arranged parallel to each other. These paths each have an upstream opening and a downstream opening. The upstream openings and the downstream openings are alternately closed. The filter 38 traps the particulates within the exhaust gas when the exhaust gas of the engine 1 flows through the filter 38.

The pre-stage oxidizing catalyst 36 produces $NO_2$ by oxidizing NO contained in the exhaust gas. Since the pre-stage oxidizing catalyst 36 is placed in the upstream of the filter 38, the $NO_2$ produced in the pre-stage oxidizing catalyst 36 enters the filter 38. The particulates trapped and accumulated in the filter 38 react with the $NO_2$ supplied from the pre-stage oxidizing catalyst 36 to be oxidized. In result, continuous regeneration of the filter 38 is carried out.

Contained in the downstream casing 34 is an ammonia selective reduction-type NOx catalyst (hereinafter, referred to as an SCR catalyst) 40 that adsorbs ammonia within the exhaust gas and then selectively reduces the NOx within the exhaust gas by using ammonia as a reducing agent. In the downstream side of the SCR catalyst 40, there is disposed a post-stage oxidizing catalyst 42 for removing from the exhaust gas the ammonia that has flowed out of the SCR catalyst 40. The post-stage oxidation catalyst 42 also has a function of oxidizing CO produced when the particulates are incinerated due to forced regeneration of the filter 38 and of discharging $CO_2$ produced from the CO into the atmosphere.

A urea-water injector 44 is set downstream from the filter 38 of the upstream casing 30. The urea-water injector 44 functions to inject urea-water, which has been supplied from a urea-water tank, not shown, into the exhaust gas that flows out of the filter 38 and enters the communication path 32.

The urea-water injected from the urea-water injector 44 is hydrolyzed by exhaust gas heat, and ammonia is produced. The produced ammonia is supplied to the SCR catalyst 40 together with the exhaust gas. The SCR catalyst 40 adsorbs the supplied ammonia and promotes denitrifying reaction between the ammonia and NOx contained in the exhaust gas. In this manner, the NOx within the exhaust gas is reduced and converted into harmless $N_2$. If the ammonia flows out of the SCR catalyst 40 without reacting with the NOx, this ammonia is removed from the exhaust gas by the post-stage oxidizing catalyst 42.

An exhaust temperature sensor 46 for detecting the temperature of the exhaust gas that has passed through the filter 38 is disposed in between the filter 38 and the urea-water injector 44. The exhaust temperature detected by the exhaust temperature sensor 46 is used in control for keeping well the functions of the exhaust after-treatment device 28, including determination as to whether the exhaust temperature is suitable for the injection of the urea-water into the exhaust gas.

The exhaust after-treatment device 28, particularly a constitution of the upstream casing 30 side thereof, will be described below in detail with reference to FIGS. 2 and 3.

Figure 2:
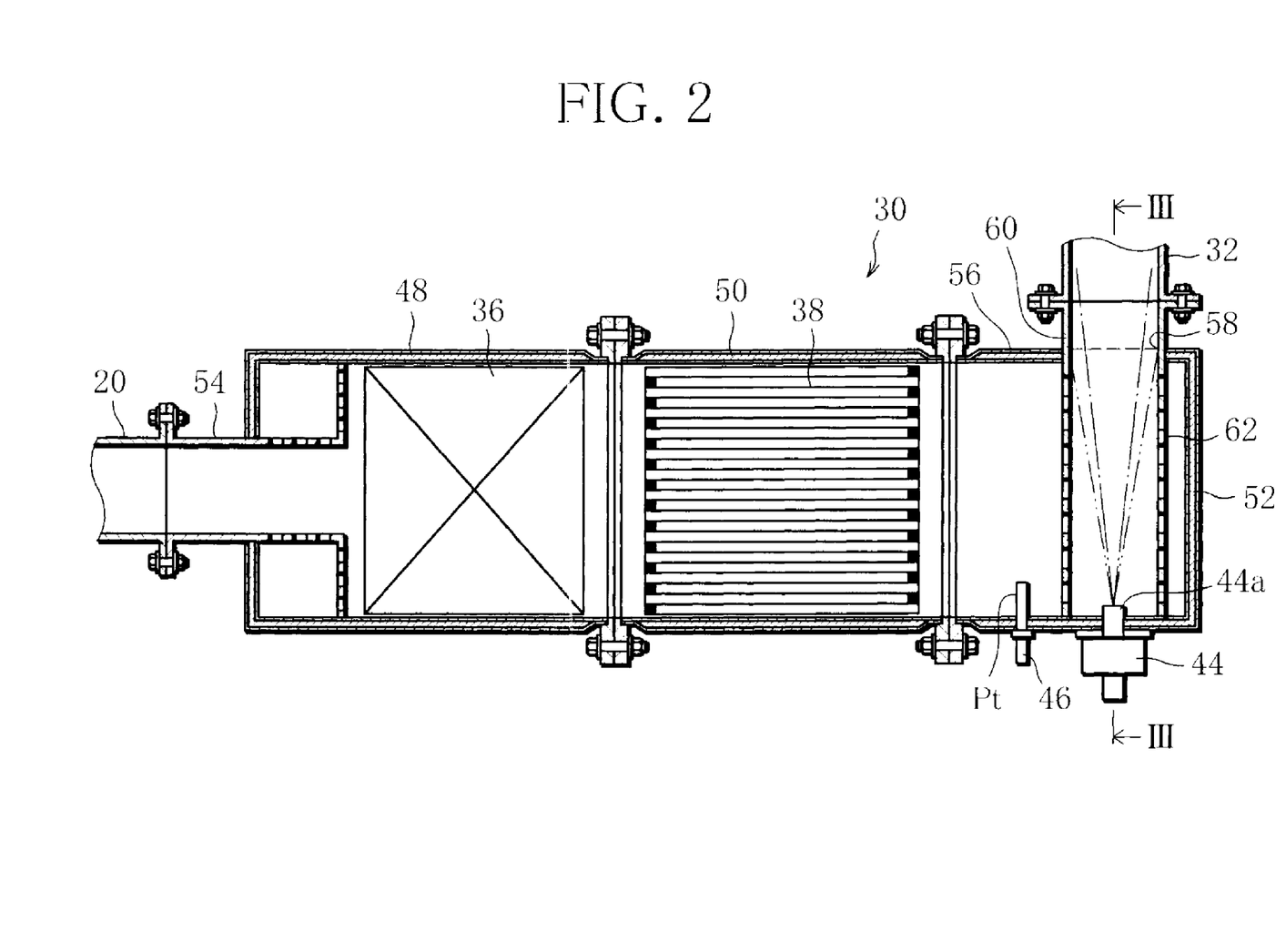
FIG. 2 is a sectional view showing a substantial part of an upstream casing in the exhaust purification apparatus shown in FIG. 1.

FIG. 2 is a sectional view showing a substantial part of the upstream casing 30 disposed in the exhaust after-treatment device 28. FIG. 3 is a sectional view, taken along line III-III in FIG. 2. The upstream casing 30 has a cylindrical shape. As illustrated in FIG. 2, the upstream casing 30 is formed of a first casing 48, a second casing 50 and a third casing 52.

The first casing 48 accommodates a pre-stage oxidizing catalyst 36 and has an exhaust gas inlet 54 connected to the exhaust pipe 20, into which the exhaust gas of the engine 1 flows. The second casing 50 has a shape of an open cylinder without end caps, and accommodates the filter 38. The second casing 50 has an upstream end that is coupled to a downstream end of the first casing 48, and a downstream end that is coupled to an upstream end of the third casing 52. An exhaust gas outlet 58 is formed in a side wall 56 of the third casing 52. The exhaust gas outlet 58 is mounted with an exhaust gas discharge pipe 60 to which the communication path 32 is connected. The exhaust gas that flows out from the exhaust gas outlet 58 after passing through the filter 38 flows toward the communication path 32 through the exhaust gas discharge pipe 60.

Figure 3:
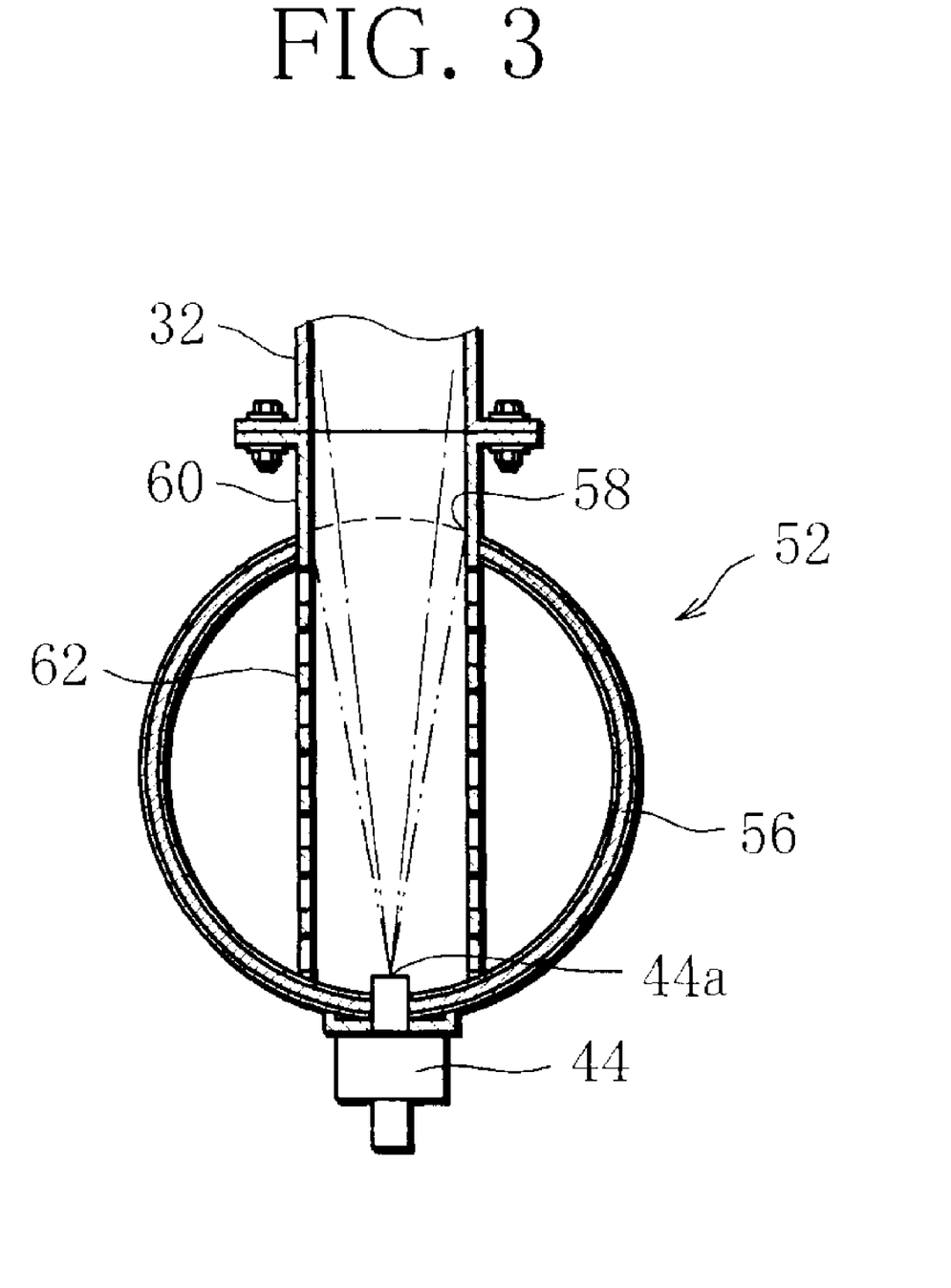
FIG. 3 is a sectional view, taken along line III-III in FIG. 2.

As illustrated in FIGS. 2 and 3, the urea-water injector 44 is installed in a position opposed to the exhaust gas outlet 58 formed in the side wall 56, and injects the urea-water toward the exhaust gas outlet 58. The urea-water injection using the urea-water injector 44 is directed radially more inward than an inner circumference of the exhaust gas discharge pipe 60 at the position corresponding to the exhaust gas outlet 58, that is, an inner circumference of the exhaust gas discharge pipe 60 in a connecting position with the side wall 56, which is shown by broken line in FIGS. 2 and 3. To put it differently, in FIGS. 2 and 3, the urea-water injection using the urea-water injector 44 is directed within an area between two single-dashed chain lines, that is, an area in between two double-dashed chain lines linking an injection port 44a of the urea-water injector 44 to the inner circumference of the exhaust gas discharge pipe 60 at the exhaust gas outlet 58, which is shown by a broken line. The urea-water injector 44 is installed in the third casing 52 so that a central axis of a urea-water spray injected from the urea-water injector 44 coincides with a central axis of the exhaust gas discharge pipe 60.

An end of the exhaust gas discharge pipe 60, which is located outside the third casing 52, is connected to the communication path 32. A cylindrical rectification body 62 extends continuously from another end of the exhaust gas discharge pipe 60, which is located opposite to the communication path 32, across the third casing 52 up to the side wall 56 opposite to the exhaust gas outlet 58. In a circumferential wall of the rectification body 62, there are formed a large number of holes connecting the outside and the inside of the rectification body 62. An end of the rectification body 62, which is opposed to the communication path 32, is fixed to the side wall 56 so as to surround the urea-water injector 44 protruding into the third casing 52. The exhaust gas that has passed through the filter 38 enters the rectification body 62 through the holes formed in the rectification body 62 and subsequently flows from the exhaust gas outlet 58 through the exhaust gas discharge pipe 60 into the communication path 32. The exhaust gas that has thus entered the communication path 32 flows through the communication path 32 into the downstream casing 34.

As mentioned above, the urea-water injector 44 injects the urea-water toward the exhaust gas outlet 58, and the central axis of the urea-water spray injected from the urea-water injector 44 coincides with the central axis of the exhaust gas discharge pipe 60. Accordingly, a direction of the central axis of the urea-water spray, which is a direction in which the urea-water injector 44 injects the urea-water, coincides with a flow direction of the exhaust gas flowing through the exhaust gas outlet 58 into the communication path 32. For this reason, an increase or decrease in flow rate of the exhaust gas flowing into the rectification body 62 does not cause a large fluctuation in a distribution of the urea-water spray in the exhaust gas flowing out from the exhaust gas outlet 58. Consequently, it is possible to maintain a good distribution of the urea-water injected from the urea-water injector 44 in the exhaust gas.

As stated above, the urea-water injector 44 injects the urea-water toward the area sandwiched by two single-dashed chain lines shown in FIGS. 2 and 3. Most of the urea-water injected from the urea-water injector 44 therefore does not adhere to an inner wall of the third casing 52, and moreover does not adhere to the rectification body 62 and an inner wall of the exhaust gas discharge pipe 60 at least up to the exhaust gas outlet 58, thereby entering the communication path 32. This prevents a problem that the urea-water is solidified in result of evaporation of the moisture contained in the urea-water that has adhered to the inner wall, and that the solid urea or the like is accumulated on the inner wall in large quantity, which incurs an increase in exhaust-gas flow resistance.

If the urea-water is injected from the urea-water injector 44 into the exhaust gas while the exhaust gas flows from the rectification body 62 into the communication path 32, the injected urea-water is hydrolyzed by exhaust gas heat, and ammonia is produced. The produced ammonia is supplied to the SCR catalyst 40 located in the downstream casing 34 and is used as a reducing agent for selective reduction of NOx, which is performed by the SCR catalyst 40.

As stated above, the urea-water is suppressed from adhering to the rectification body 62 and the inner wall of the exhaust gas discharge pipe 60, at least up to the exhaust gas outlet 58. It is then possible to supply ammonia to the SCR catalyst 40 without causing an insufficiency in ammonia supply amount by injecting from the urea-water injector 44 the urea-water of a necessary amount for the NOx selective reduction in the SCR catalyst 40, which has been obtained according to the operating condition of the engine 1. Consequently, exhaust purification efficiency of the SCR catalyst 40 can be kept favorable.

As mentioned above, the urea-water injected from the urea-water injector 44 is well distributed within the exhaust gas discharging from the exhaust gas outlet 58 without a large fluctuation in distribution. The ammonia produced from the urea-water within the exhaust gas is also well distributed within the exhaust gas without a large fluctuation in distribution, regardless of exhaust flow rate, and is supplied to the SCR catalyst 40 while being kept well distributed. This prevents a deterioration in the exhaust purification efficiency of the SCR catalyst 40, which is caused by a large fluctuation in ammonia distribution or greatly biased distribution. It is therefore possible to maintain good purification efficiency.

The exhaust gas discharged from the exhaust gas outlet 58 passes through the communication path 32 connected to the exhaust gas discharge pipe 60 and then flows into the downstream casing 34. Accordingly, the urea-water injected from the urea-water injector 44 into the exhaust gas can be fully diffused and atomized in the exhaust gas during the time period in which the urea-water flows through the communication path 32 together with the exhaust gas. The ammonia production from the urea-water can be then more successfully carried out. In this view, it is very effective to form the upstream and downstream casings 30 and 34 so as to communicate with each other through the communication path 32 in a situation where a diffusion angle of the urea-water injected from the urea-water injector 44, that is, an angle shown by two single-dashed chain lines in FIGS. 2 and 3, is relatively small.

In the present embodiment, the urea-water injector 44 is fixed to the side wall 56 of the cylindrical third casing 52. For example, when the exhaust purification apparatus of the present embodiment is applied to an engine installed in a vehicle, the urea-water injector 44 protrudes outward from the side wall 56. An interference with other apparatuses disposed adjacently to the exhaust after-treatment device 28 could be a problem. A configuration of the urea-water injector 44 for preventing such interference will be described below as a modification example of the above embodiment.

The modification example described below differs from the above embodiment only in a constitution of a part corresponding to the third casing 52 of the upstream casing 30 of the embodiment. Other parts are constructed in exactly the same way as in the embodiment. In the following description, therefore, elements constructed in the same manner as those of the embodiment will be provided with the same reference signs as the corresponding elements of the embodiment, and the explanation thereof will be omitted.

Figure 4:
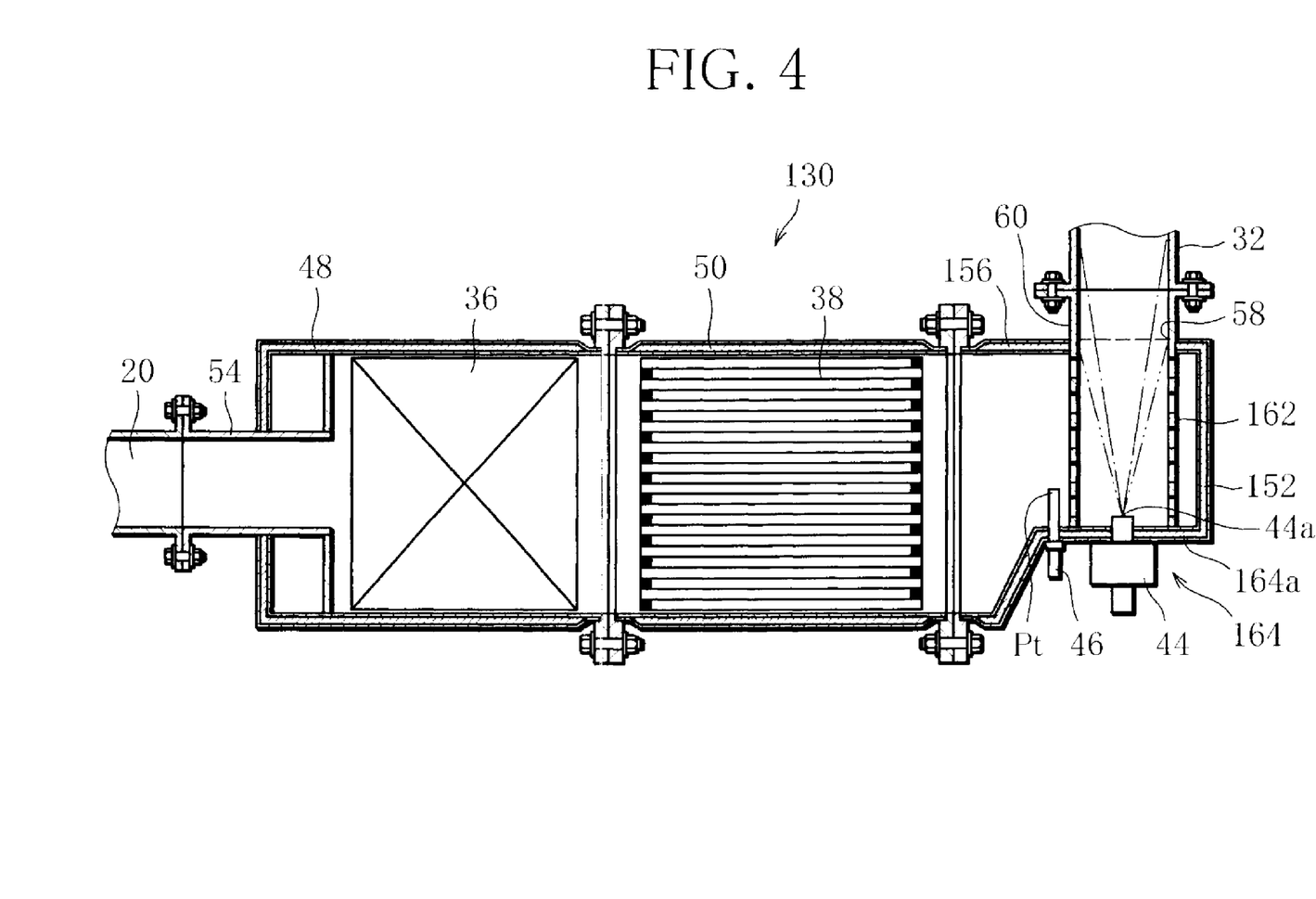
FIG. 4 is a sectional view showing a substantial part of an upstream casing in a first modification example.
Figure 5:
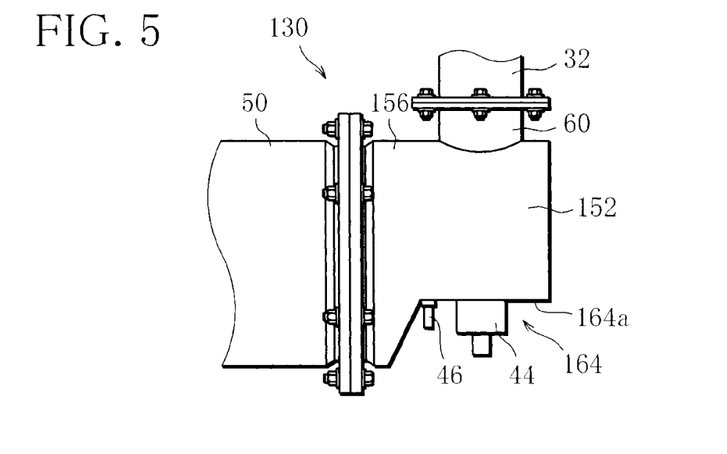
FIG. 5 is a view showing a third casing and its periphery as viewed from a side face in the first modification example.
Figure 6:
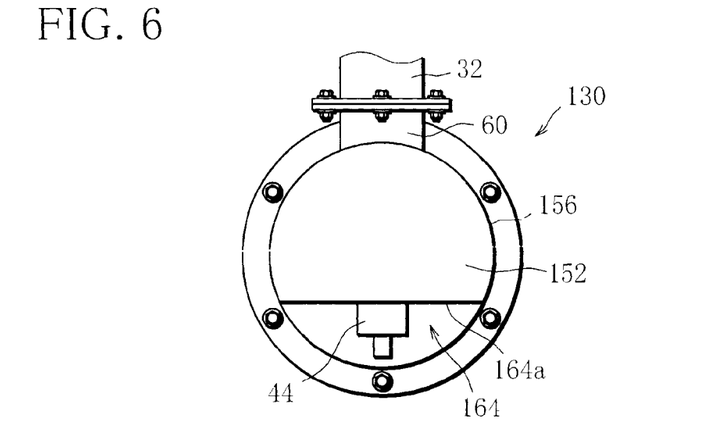
FIG. 6 is a view showing the third casing and its periphery as viewed from a downstream side in the first modification example.
Figure 7:
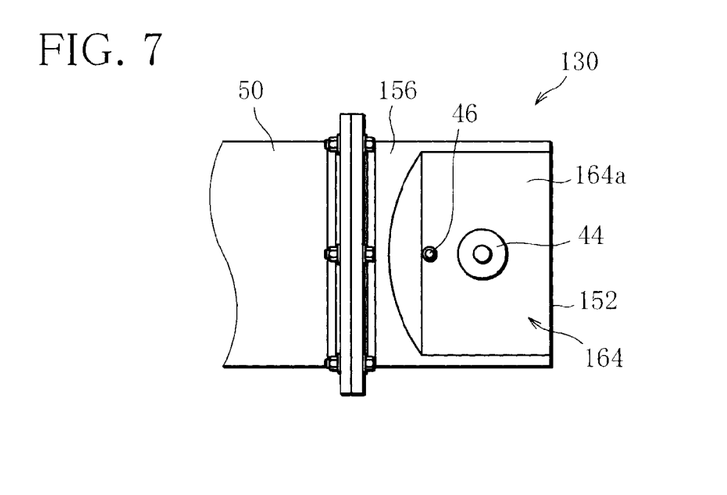
FIG. 7 is a view showing the third casing and its periphery as viewed from the bottom in the first modification example.

An exhaust purification apparatus according to a first modification example of the above embodiment will be described below in detail with reference to FIGS. 4 to 7. FIG. 4 is a sectional view showing a substantial part of an upstream casing 130 of the first modification example. FIGS. 5 to 7 show the third casing 152 and its periphery as viewed from a side face, a downstream-side and a bottom in the first modification example.

As illustrated in FIG. 4, the upstream casing 130 has a cylindrical shape as with the afore-mentioned embodiment, and is divided into a first casing 48, a second casing 50 and a third casing 152. The first casing 48 and the second casing 50 are constructed in the same manner as in the afore-mentioned embodiment.

An exhaust gas outlet 58 is formed in a side wall 156 of the third casing 152 as in the afore-mentioned embodiment. The exhaust gas outlet 58 is mounted with an exhaust gas discharge pipe 60 to which a communication path 32 is connected. The exhaust gas that flows out from the exhaust gas outlet 58 after passing through the filter 38 flows toward the communication path 32 through the exhaust gas discharge pipe 60.

As illustrated in FIGS. 4 to 7, a recess 164 is formed in the side wall 156 to be located in a position opposed to the exhaust gas outlet 58. A flat portion 164a of the recess 164 is formed along an axis of the third casing 152, and a urea-water injector 44 is fixed onto the flat portion 164a so as to be opposed to the exhaust gas outlet 58. The urea-water injector 44 is so arranged as to inject and supply urea-water toward the exhaust gas outlet 58.

Since the urea-water injector 44 is fixed to the recess 164, when the upstream casing 30 is viewed from the downstream side in an axial direction thereof, the urea-water injector 44 is located more inside than an exterior face having a maximum diameter of the side wall 156 of the third casing 152 as illustrated in FIG. 6. It is then possible to suppress an influence of the urea-water injector 44 upon a space occupied by the exhaust after-treatment device.

Similarly to the afore-mentioned embodiment, the urea-water injection of the urea-water injector 44 is directed radially more inward than an inner circumference of the exhaust gas discharge pipe 60 at the position corresponding to the exhaust gas outlet 58 as illustrated in FIG. 4, that is, an inner circumference of the exhaust gas discharge pipe 60 in a connecting position with the side wall 156, which is shown by broken line in FIG. 4. To put it differently, in FIG. 4, the urea-water injection using the urea-water injector 44 is directed within an area between two single-dashed chain lines, that is, an area in between two double-dashed chain lines linking an injection port 44a of the urea-water injector 44 to the inner circumference of the exhaust gas outlet 58, which is shown by broken line. The urea-water injector 44 is installed in the third casing 152 so that a central axis of a urea-water spray injected from the urea-water injector 44 coincides with a central axis of the exhaust gas discharge pipe 60.

An end of the exhaust gas discharge pipe 60, which is located outside the third casing 152, is connected to the communication path 32. A cylindrical rectification body 162 extends continuously from another end of the exhaust gas discharge pipe 60, which is located opposite to the communication path 32, across the third casing 152 up to the recess 164 opposite to the exhaust gas outlet 58. In a circumferential wall of the rectification body 162, there are formed a large number of holes connecting the outside and the inside of the rectification body 162. An end of the rectification body 162, which is located on the recess 164 side, is fixed to the recess 164 so as to surround the urea-water injector 44 protruding into the third casing 152. The exhaust gas that has passed through the filter 38 enters the rectification body 162 through the holes formed in the rectification body 162 and subsequently flows from the exhaust gas outlet 58 through the exhaust gas discharge pipe 60 into the communication path 32. The exhaust gas that has thus entered the communication path 32 flows through the communication path 32 into the downstream casing 34.

Because of the exhaust gas outlet 58 formed in the side wall 156 of the third casing 152, the exhaust gas that has passed through the filter 38 flows toward the exhaust gas outlet 58 located opposite to the recess 164. Since the recess 164 is located opposite to the exhaust gas outlet 58, an influence of the recess 164 upon an exhaust gas flow is small, which makes it possible to suppress a pressure loss with respect to exhaust pressure that is created due to the recess 164.

As mentioned above, the urea-water injector 44 injects the urea-water toward the exhaust gas outlet 58, and the central axis of the urea-water spray injected from the urea-water injector 44 coincides with the central axis of the exhaust gas discharge pipe 60. Accordingly, a direction of the central axis of the urea-water spray, which is a direction in which the urea-water injector 44 injects the urea-water, coincides with a flow direction of the exhaust gas flowing through the exhaust gas outlet 58 into the communication path 32. For this reason, an increase or decrease in flow rate of the exhaust gas flowing through the rectification body 162 does not cause a large fluctuation in a distribution of the urea-water spray in the exhaust gas flowing out from the exhaust gas outlet 58. It is then possible to maintain a good distribution of the urea-water injected from the urea-water injector 44 into the exhaust gas.

As stated above, the urea-water injector 44 injects the urea-water toward the area sandwiched by two single-dashed chain lines shown in FIG. 4. Most of the urea-water injected from the urea-water injector 44 therefore does not adhere to an inner wall of the third casing 152, and moreover does not adhere to the rectification body 162 and an inner wall of the exhaust gas discharge pipe 60 at least up to the exhaust gas outlet 58, thereby entering the communication path 32. This prevents a problem that the urea-water is solidified in result of evaporation of the moisture contained in the urea-water attached onto the accumulated on the inner wall in large quantity, which incurs an increase in exhaust-gas flow resistance.

By injecting the urea-water from the urea-water injector 44 fixed onto the recess 164, the urea-water is injected into the exhaust gas at a position closer to the exhaust gas outlet 58, as compared to the afore-mentioned embodiment. The urea-water is therefore injected into the exhaust gas at a position closer to a radially central portion of the exhaust gas flowing out of the filter 38, and the urea-water spray can be more successfully distributed in the exhaust gas.

If the urea-water is injected from the urea-water injector 44 into the exhaust gas while the exhaust gas flows from the rectification body 162 into the communication path 32, the injected urea-water is hydrolyzed by exhaust gas heat, and ammonia is produced. The produced ammonia is supplied to the SCR catalyst 40 located in the downstream casing 34 and is used as a reducing agent for selective reduction of NOx, which is performed by the SCR catalyst 40, as in the afore-mentioned embodiment.

As stated above, the urea-water is suppressed from adhering to the rectification body 162 and the inner wall of the exhaust gas discharge pipe 60, at least up to the exhaust gas outlet 58. It is then possible to supply ammonia to the SCR catalyst 40 without causing an insufficiency in ammonia supply amount by injecting from the urea-water injector 44 the urea-water of a necessary amount for the NOx selective reduction in the SCR catalyst 40, which has been obtained according to the operating condition of the engine 1. Consequently, exhaust purification efficiency of the SCR catalyst 40 can be kept favorable.

As mentioned above, the urea-water injected from the urea-water injector 44 is well distributed within the exhaust gas discharging from the exhaust gas outlet 58 without a large fluctuation in distribution. In addition, the urea-water is injected into the exhaust gas at a position closer to the exhaust gas outlet 58 than in the afore-mentioned embodiment. The ammonia produced from the urea-water within the exhaust gas is also well distributed within the exhaust gas without a large fluctuation in distribution, regardless of exhaust flow rate, and is supplied to the SCR catalyst 40 while being kept well distributed. This prevents a large fluctuation in ammonia distribution and a deterioration in the exhaust purification efficiency of the SCR catalyst 40, which is caused by greatly biased distribution. It is therefore possible to maintain better purification efficiency.

In the first modification example, too, the exhaust gas that has been discharged from the exhaust gas outlet 58 enters the downstream casing 34 after passing through the communication path 32 connected to the exhaust gas discharge pipe 60. Accordingly, the urea-water injected from the urea-water injector 44 into the exhaust gas can be fully diffused and atomized in the exhaust gas during the time period in which the urea-water flows through the communication path 32 together with the exhaust gas.

According to the first modification example, an exhaust temperature sensor 46 is set in the flat portion 164a of the recess 164 so as to be located upstream from the urea-water injector 44. The exhaust temperature sensor 46 detects exhaust temperature between the filter 38 and the rectification body 162. If the exhaust temperature sensor 46 is fixed onto the recess 164 in this manner, a sensor 46 is positioned substantially on an extension line of a central axis of the filter 38.

Since the exhaust temperature sensor 46 is fixed to the recess 164, when the upstream casing 130 is viewed from the downstream side in an axial direction thereof, the exhaust temperature sensor 46 is located more inside than an exterior face having a maximum diameter of the side wall 156 of the third casing 152 as with the urea-water injector 44. It is then possible to suppress an influence of the exhaust temperature sensor 46 upon a space occupied by the exhaust after-treatment device.

If the exhaust temperature sensor 46 is fixed onto the recess 164 in this manner, the temperature detection point Pt of the exhaust temperature sensor 46 is located closer to the radially central portion of the exhaust gas flowing from the filter 38 to the exhaust gas outlet 58, as compared to the case in which the exhaust temperature sensor 46 is fixed onto the side wall 156 without the recess 164 as in the afore-mentioned embodiment. Consequently, accuracy in detecting exhaust temperature is improved. This makes it possible to enhance the accuracy of control that is implemented to secure a good exhaust purification efficiency of the exhaust after-treatment device.

Especially in the present modification example, the temperature detection point Pt of the exhaust temperature sensor 46 is positioned substantially on the extension line of the central axis of the filter 38, so that it is possible to detect temperature that is virtually equal to temperature of the radially central portion of the exhaust gas flowing from the filter 38 to the exhaust gas outlet 58. Accordingly, the temperature detection accuracy is further improved.

Since the urea-water injector 44 and the exhaust temperature sensor 46 are set in the flat portion 164a of the recess 164, which is formed along the axis of the third casing 152, it is easy to install the urea-water injector 44 and the exhaust temperature sensor 46.

The shape of the recess is not limited to the one in the first modification example, and various shapes may be applied. Second and third modification examples, as a modification example of the recess, will described below with reference to the attached drawings. The second and third modification examples differ from the first modification example only in shape of the recess. Other constitutions of the second and third modification examples are the same as those of the first modification example.

Figure 8:
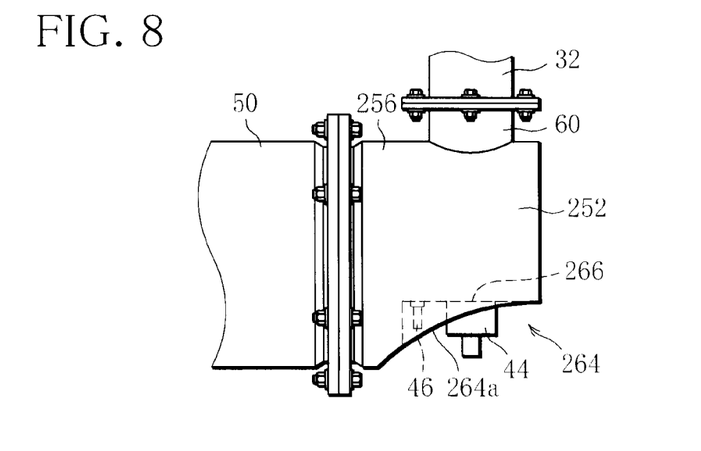
FIG. 8 is a view showing a third casing and its periphery as viewed from a side face in a second modification example.
Figure 9:
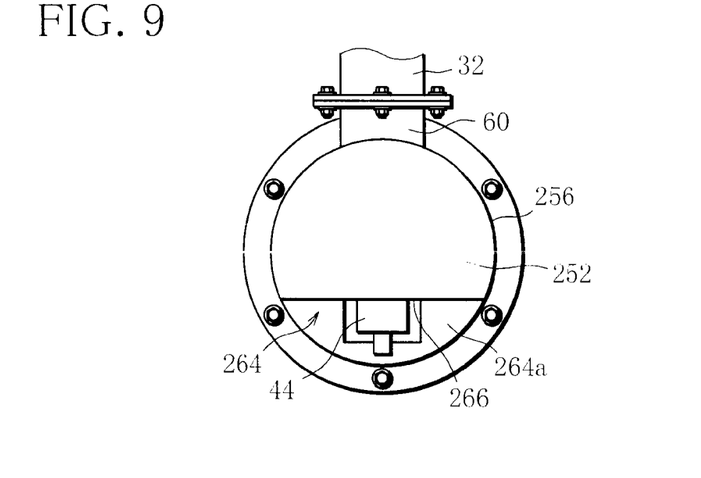
FIG. 9 is a view showing the third casing and its periphery as viewed from a downstream side in the second modification example.
Figure 10:
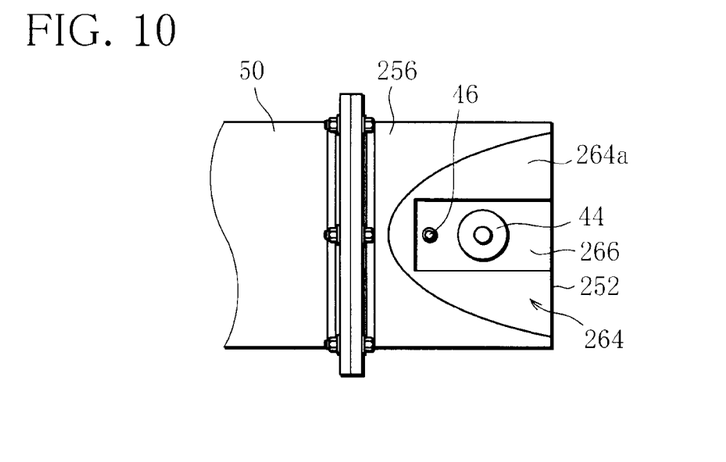
FIG. 10 is a view showing the third casing and its periphery as viewed from the bottom in the second modification example.

FIGS. 8 to 10 show a third casing 252 having a recess 264 of the second modification example and a periphery of the third casing 252, in the same manner as in FIGS. 5 to 7.

As illustrated in FIG. 8, the recess 264 arranged in a side wall 256 in the second modification example is formed of a curved face 264a with a shape of a concave that gets closer to the exhaust gas discharge pipe 60 (i.e. the exhaust gas outlet 58, not shown in FIGS. 8 to 10) in the downstream direction. A groove 266 is formed in the curved face 264a of the recess 264. The urea-water injector 44 and the exhaust temperature sensor 46 are installed in the groove 266. As mentioned above, the second modification example differs from the first modification example only in the shape of the recess 264, and the constitution in the third casing 252 is similar to the first modification example. A positional relationship of constituents located in the third casing 252, the urea-water injector 44 and the exhaust temperature sensor 46 is the same as in the first modification example. The second modification example accordingly offers the same advantages as in the first modification example. Except for the groove 266, the recess 264 is formed of a curved face, so that an influence upon the exhaust gas flow can be reduced, as compared to the first modification example. This further suppresses a pressure loss that is produced with respect to an exhaust pressure due to the recess 264.

Figure 11:
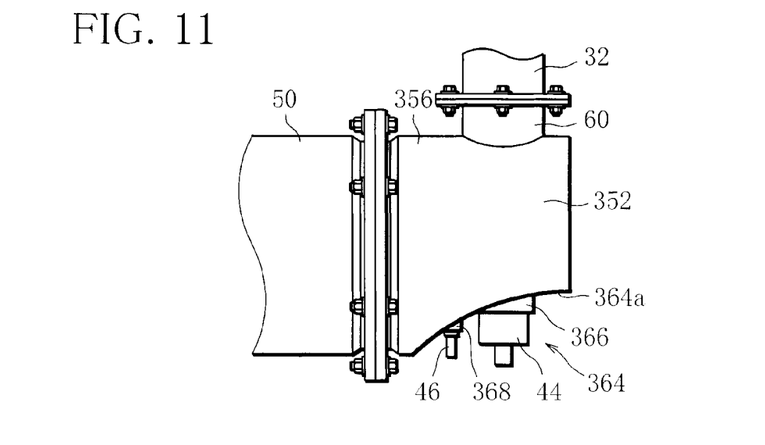
FIG. 11 is a view showing the third casing and its periphery as viewed from a side face in a third modification example.
Figure 12:
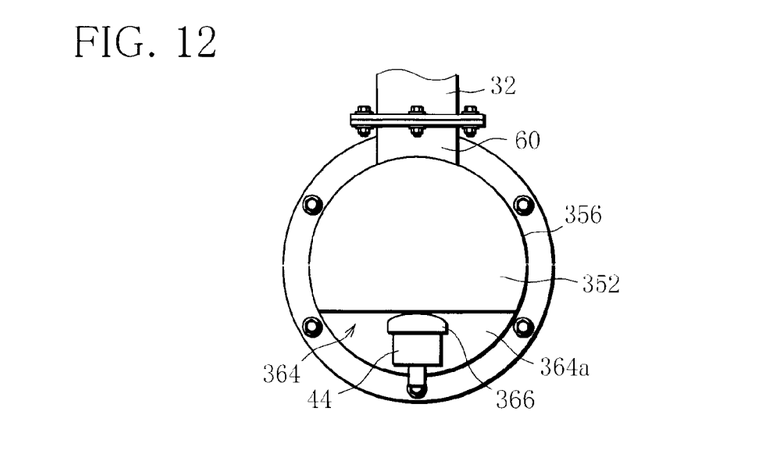
FIG. 12 is a view showing the third casing and its periphery as viewed from a downstream side in the third modification example.
Figure 13:
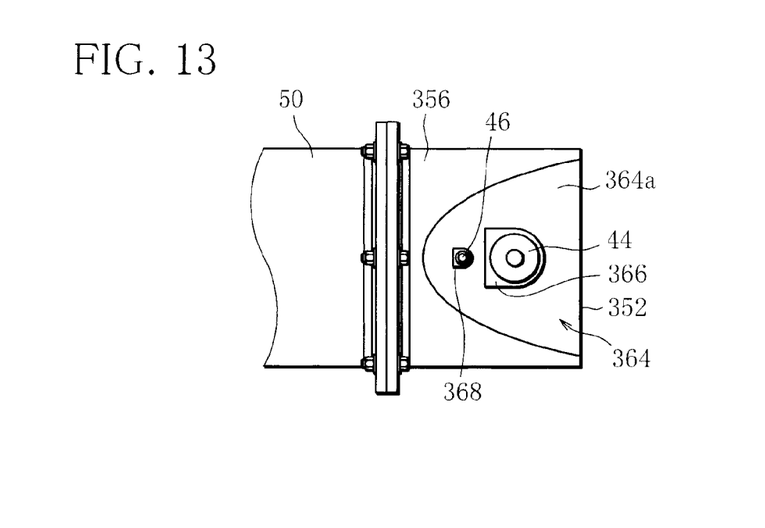
FIG. 13 is a view showing the third casing and its periphery as viewed from the bottom in the third modification example.

FIGS. 11 to 13 show a third casing 352 having a recess 364 of the third modification example and a periphery of the third casing 352, in the same manner as in FIGS. 5 to 7.

As illustrated in FIG. 11, the recess 364 arranged in a side wall 356 in the third modification example is also formed of a curved face 364a with a shape of a concave. However, the urea-water injector 44 is fixed to a first stepped portion 366 formed in the curved face 364a of the recess 364, whereas the exhaust temperature sensor 46 is set in a second stepped portion 368 formed in the curved face 364a of the recess 364. As mentioned above, the third modification example differs from the first and second modification examples only in the shape of the recess 364, and the constitution in the third casing 352 is similar to the first and second modification examples. A positional relationship of constituents located in the third casing 352, the urea-water injector 44 and the exhaust temperature sensor 46 is the same as in the first and second modification examples. The third modification example accordingly offers the same advantages as in the first modification example. Except for the first stepped portion 366 and the second stepped portion 368, the recess 364 is formed of a curved face, so that an influence upon the exhaust gas flow can be reduced, as compared to the first modification example. This further suppresses a pressure loss that is produces with respect to an exhaust pressure due to the recess 364.

Since the urea-water injector 44 and the exhaust temperature sensor 46 are fixed to the first and second stepped portions 366 and 368 in the third modification example, a protrusion amount of the urea-water injector 44 and the exhaust temperature sensor 46 from the third casing 352 is lager than in the second modification example. For this reason, the third modification example is somewhat disadvantageous in terms of occupied space. However, the third modification example does not require the groove 266 unlike the second modification example, so that an influence upon the exhaust gas flow can be further reduced, as compared to the first and second modification examples.

The first, second and third modification examples have been described above as modification examples in which the urea-water injector 44 is mounted on the recess formed in the third casing. As seen in these modification examples, the shape of the recess may be modified in various ways. For example, a curved face with a convex shape may be applied, instead of the curved face with the concave shape as in the second and third modification examples. A complex curved face may also be applied.

The urea-water injector 44 and the exhaust temperature sensor 46 does not have to be disposed so that the entire bodies are located more inside than the maximum-diameter portion of the side wall of the upstream casing, when the upstream casing is viewed from the downstream side in the axial direction thereof. If a part of the urea-water injector 44 or a part of the exhaust temperature sensor 46 is protruding as in the third modification example, an influence of the urea-water injector 44 and the exhaust temperature sensor 46 upon the occupied space of the third casing can be suppressed, as compared to the case in which there is no recess.

This is the end of descriptions of the exhaust purification apparatus according to the one embodiment and modification examples of the invention, but the invention is not limited to the embodiment and the modification examples.

Although, in the embodiment, the rectification body 62 leading to the side wall 56 extends continuously from the exhaust gas discharge pipe 60, the shape of the rectification body 62 is not limited thereto. For example, the rectification body 62 may extend continuously from the exhaust gas discharge pipe 60 up to the middle of the third casing 52, instead of reaching the side wall 56. Alternatively, the rectification body 62 may be entirely omitted. Such modification of the rectification body can be made also in the first, second and third modification examples.

According to the embodiment, the annular exhaust gas discharge pipe 60 is so mounted as to project from the side wall 56 of the third casing 52, which corresponds to the side wall of the upstream casing 30, and the communication path 32 is connected to the exhaust gas discharge pipe 60. It is also possible, for example, to form the exhaust gas outlet 58 in the side wall 56 of the third casing 52 so that the communication path 32 is connected directly to the exhaust gas outlet 58.

In the first to third modification examples, the urea-water injector 44 and the exhaust temperature sensor 46 are mounted on the recess of the upstream casing. For example, the exhaust temperature sensor 46 is provided when needed, so that only the urea-water injector 44 may be fixed to the recess.

According to the embodiment, the exhaust after-treatment device 28 is constructed so that the upstream casing 30 and the downstream casing 34 are connected to each other through the communication path 32. It is also possible, however, to arrange the upstream casing 30 and the downstream casing 34 adjacently to each other so that the exhaust gas discharge pipe 60 of the upstream casing 30 is made to communicate directly with the downstream casing 34. It is also possible to arrange the exhaust gas outlet 58 of the upstream casing 30 to communicate directly with the downstream casing 34. Such modification can be made also in the first, second and third modification examples.

The pre-stage oxidizing catalyst 36 and the post-stage oxidizing catalyst 42 are provided to the exhaust after-treatment device 28 of the embodiment according to need. These catalysts may therefore be replaced with other catalysts having similar functions or omitted.

In the embodiment, the engine 1 is a four-cylinder diesel engine. However, the engine 1 is not limited thereto in terms of the number of cylinders, the type and the shape. Any engine can be applied to the invention as long as it has the filter 38 and the SCR catalyst 40 located downstream of the filter 38.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

This application is based on, and claims priority to, Japanese Patent Application No: 2007-263152, filed on Oct. 9, 2007, Japanese Patent Application No.: 2007-270184, filed Oct. 17, 2007 and Japanese Patent Application No.: 2007-270188, filed Oct. 17, 2007. The disclosure of the priority application, in its entirety, including the drawings, claims, and the specification thereof, is incorporated herein by reference.

What is claimed is:

1. An exhaust purification apparatus for an engine, having a particulate filter that traps particulates contained in engine exhaust gas and an ammonia selective reduction-type NOx catalyst that selectively reduces NOx contained in the exhaust gas by using ammonia as a reducing agent, the apparatus comprising:

an upstream casing that has a cylindrical shape and accommodates the particulate filter;

an exhaust gas outlet that is formed in a side wall of the upstream casing so as to be located downstream from the particulate filter, and discharges the exhaust gas that has passed through the particulate filter;

a urea-water injector that is fixed to the upstream casing to be located in a position opposed to the exhaust gas outlet, and injects urea-water toward the exhaust gas outlet; and a downstream casing that accommodates the ammonia selective reduction-type NOx catalyst into which the exhaust gas discharged from the exhaust gas outlet flows, wherein the side wall of the upstream casing has a recess depressed inward from the upstream casing and formed in a position opposed to the exhaust gas outlet; and the urea-water injector is fixed to the recess.

2. The exhaust purification apparatus for an engine according to claim 1, wherein the urea-water injector injects the urea-water radially more inward than an inner circumference of the exhaust gas outlet.

3. The exhaust purification apparatus for an engine according to claim 1, wherein the exhaust gas outlet and the downstream casing communicate with each other through a communication path.

4. The exhaust purification apparatus for an engine according to claim 1, wherein the recess has a flat portion formed along an axis of the upstream casing; and the urea-water injector is fixed to the flat portion.

5. The exhaust purification apparatus for an engine according to claim 1, wherein the recess has a curved face that gradually gets closer to the exhaust gas outlet in a downstream direction from the side wall; and the urea-water injector is fixed to the curved face.

6. The exhaust purification apparatus for an engine according to claim 1, further comprising an exhaust temperature sensor that is fixed to the recess and detects temperature of the exhaust gas flowing from the particulate filter toward the exhaust gas outlet.

7. The exhaust purification apparatus for an engine according to claim 6, wherein the exhaust temperature sensor is fixed to the recess so that an exhaust temperature detection point is positioned substantially on an extension line of a central axis of the particulate filter.

* * * * *